United States Patent
Fraser et al.

(10) Patent No.: US 6,946,550 B2
(45) Date of Patent: Sep. 20, 2005

(54) FLUORESCENT PIGMENTS

(75) Inventors: Iain Frank Fraser, Kilbirnie (GB); Ian Alexander Macpherson, Fife (GB); David Macdonald Smith, Fife (GB); Simon Martyr, Bedford (GB); Greig Chisholm, Glasgow (GB); Stephen John Coughlin, Muirhead (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/495,518

(22) PCT Filed: Nov. 19, 2002

(86) PCT No.: PCT/EP02/12958

§ 371 (c)(1),
(2), (4) Date: May 14, 2004

(87) PCT Pub. No.: WO03/046086

PCT Pub. Date: Jun. 5, 2003

(65) Prior Publication Data

US 2005/0014936 A1 Jan. 20, 2005

(30) Foreign Application Priority Data

Nov. 28, 2001 (EP) .............................................. 01811152

(51) Int. Cl.$^7$ ..................... C09B 35/10; C09B 35/18; C09D 11/02; C08K 5/23; C09K 11/06
(52) U.S. Cl. .................... 534/760; 534/822; 106/31.64; 106/496; 524/108; 524/190
(58) Field of Search ................................. 534/760, 822; 106/31.64, 496; 524/108, 190

(56) References Cited

U.S. PATENT DOCUMENTS 5,863,459 A * 1/1999 Merchak et al. ....... 252/301.16
5,904,878 A * 5/1999 Merchak et al. ......... 252/30.16

FOREIGN PATENT DOCUMENTS

| EP | 0982372 | 3/2000 |
|----|---------|--------|
| EP | 0982373 | 3/2000 |

OTHER PUBLICATIONS

A. Fadda et al., Indian Journal of Textile Research, vol. 9, Sep. 1994, pp. 115–117.

* cited by examiner

Primary Examiner—Fiona T. Powers
(74) Attorney, Agent, or Firm—Tyler A. Stevenson

(57) ABSTRACT

Azo compounds of formula (I), wherein X stands for halogen, in particular for chlorine, or $C_1$–$C_4$alkoxy, in particular for methoxy, Y stands for —$CH_2$— or —O—, $R_1$ and $R_2$, independently from each other, stand for hydrogen, $C_1$–$C_8$alkyl, or $C_6$–$C_{14}$aryl, which may be substituted up to three times with $C_1$–$C_8$alkyl, $C_1$-$C_4$alkoxy or halogen, a process for their preparation and their use as fluorescent compounds, in particular as solid fluorescent compounds, such as for special effect printing, sectrity printing or in the opto-electronic field.

(I)

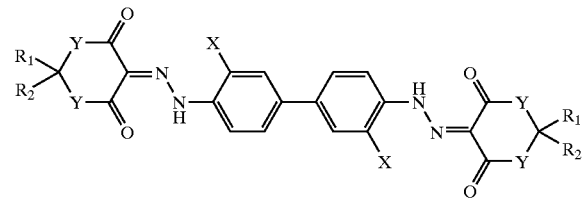

5 Claims, No Drawings

FLUORESCENT PIGMENTS

The present invention relates to novel yellow and red azo compounds, a process for their preparation and their use as fluorescent compounds, in particular as solid fluorescent compounds, such as for special effect printing, security printing or in the opto-electronic field.

Pigments are differentiated from dyes by their physical characteristics rather than by chemical composition. Dyes, unlike pigments, dissolve during their application and in the process lose their crystal or particulate structure.

Fluorescent colorants, which generally are based on organic dyes, represent an important class of materials commonly used in coloring printing inks, paints and plastics to impart a desired color. Such colorants often referred to as industrial fluorescent pigments are obtained by dissolving a fluorescent dye in a suitable media, such as a resin matrix. The resin matrix is then broken to a specific size, typically of several microns, so that it may be used as a pigment.

In general, organic pigments exhibit no fluorescence or their fluorescence is only of low intensity. The prior art only describes a limited number of fluorescent organic pigments, as, for example, fluorescent C.I.Pigment Yellow 101 described in W. Herbst and K. Hunger, *Industrial Organic Pigments*, 2$^{nd}$ Ed., VCH Verlagsgesellschaft, Weinheim, 1997, 571–572.

Compared to dyes, pigments have several advantages, such as their good lightfastness properties or weather resistance and freedom from transfer problems.

Therefore, it is desirable to impart fluorescence to organic pigments, so as to obtain fluorescent organic pigments which may find application, e.g. in special effect printing or security printing applications showing the advantageous properties inherent to the physical characteristics of pigments and thus representing a favorable alternative to the fluorescent dyes mentioned above. U.S. Pat. Nos. 5,863,459 and 5,904,878 describe a method of enhancing the fluorescence of yellow and orange diarylide pigments by first, isolating the synthesized pigment as a dry powder and, then, adding the dried pigment to an organic solvent or water to obtain a slurry which is subjected to a heat treatment under elevated pressure for several hours. The maximum increase in spectral response achieved by the method of the prior art relative to the untreated pigment is approximately 8% when the fluorescence of an ink formulation drawn down on to a substrate is measured with a spectrophotometer. Treatment of the pigment slurry in an organic solvent, such as ethanol, yields a fluorescence intensity enhancement approximately twice the amount achieved by treatment in water. It is a disadvantage of the prior art that the pigment has to be isolated prior to the treatment and that the treatment requires an organic solvent in order to obtain appreciable results. Treatment of the pigment under severe conditions is considered to be a further disadvantage.

Therefore, a need still exists for fluorescent organic pigments, which can be obtained by a straightforward, and easily carried out process that does not show the disadvantages of the prior art and which pigments show fluorescence, in particular in the solid state, of high intensity.

Accordingly, the claimed pigments of formula (I) have been found. In addition, a process for their preparation, and their use have been found, too.

The present invention relates to azo pigments of formula (I)

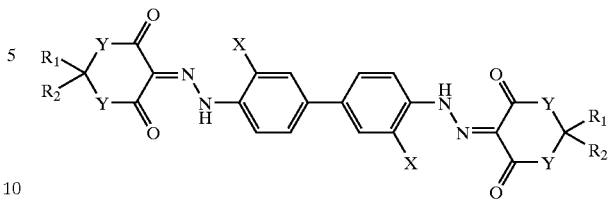

wherein X stands for halogen, in particular for chlorine, or $C_1$–$C_4$alkoxy, in particular for methoxy, Y stands for —$CH_2$— or —O—, preferably for —O—, and $R_1$ and $R_2$, independently from each other, stand for hydrogen, $C_1$–$C_8$alkyl, or $C_1$–$C_{14}$aryl, which may be substituted up to three times with $C_1$–$C_8$alkyl, $C_1$–$C_4$alkoxy or halogen, preferably for $C_1$–$C_8$ alkyl, in particular for methyl, with the proviso that X is not methoxy if both $R_1$ and $R_2$ are methyl and Y is —O—.

Halogen has the meaning of fluorine, chlorine, bromine or iodine, preferably chlorine. $C_1$–$C_8$alkyl stands for methyl, ethyl, n-, i-propyl, n-, i-, sec.-, tert.-butyl, n-pentyl, isoamyl, n-hexyl, n-heptyl, n-octyl, 2-ethylhexyl, preferably $C_1$–$C_4$alkyl such as methyl, ethyl, n-, i-propyl, n-, i-, sec.-, tert.-butyl; particular preferred is ethyl and especially methyl.

$C_1$–$C_4$alkoxy stands for methoxy, ethoxy, n-, i-propoxy, or n-butoxy, preferably for ethoxy and particularly for methoxy.

$C_6$–$C_{14}$aryl stands for phenyl, 1-, 2-naphthyl, 1-, 2-anthracenyl, 1-, 2-phenanthrenyl, preferably for phenyl.

Particularly preferred azo compounds I are those in which
a) X is chlorine, Y is —O—, and $R_1$ and $R_2$ stand for hydrogen,
b) X is chlorine, Y is —$CH_2$—, and $R_1$ and $R_2$ stand for methyl,
c) X is methoxy, Y is —O—, and $R_1$ and $R_2$ stand for hydrogen,
d) X is methoxy, Y is —$CH_2$—, and $R_1$ and $R_2$ stand for methyl.

The process for preparing the azo pigment I can be carried out in a customary way and is not particularly restricted. For example, the benzidine derivative of formula (II)

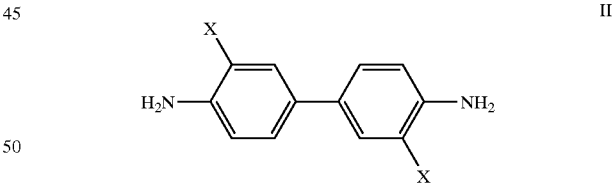

is tetrazotised at −10 to 10° C. to prepare the tetrazo component. The coupling component, diketone of formula (III)

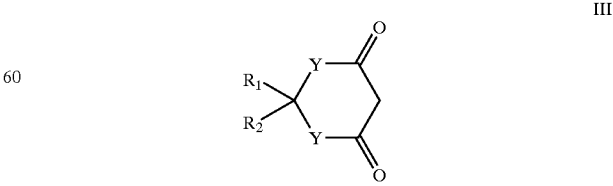

is usually dissolved in an aqueous solution of sodium hydroxide, which as a rule is then adjusted to a pH below 7, before the tetrazo component is added. Generally, the temperature during coupling is kept in the range of from −5 to 50° C., preferably −2 to 20° C. Then, the reaction mixture is usually heated for 0.1 to 2 hours to a temperature in the range of from 50 to 100° C. After the heating step, the reaction product is separated from the reaction mixture in usual ways e.g. by filtration, optionally washed with water to remove soluble salts, and thereafter dried. Also preferably, the dried product is ground to a powder or granulated.

The novel azo pigments of formula (I) may be given an after-treatment to improve their properties, for example their dispersibility in inks, paints or plastics. Methods of after-treatment are well known to those skilled in the art.

Another embodiment of this invention is directed to the use (or method of use) of the novel azo pigments of formula (I)

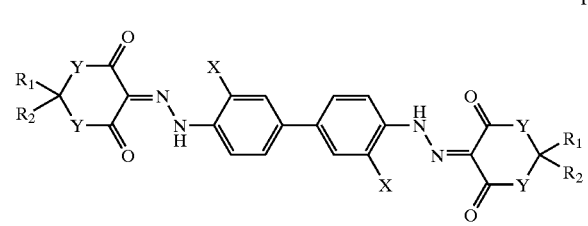

I wherein X stands for halogen, in particular for chlorine, or $C_1$–$C_4$alkoxy, in particular for methoxy, Y stands for —$CH_2$— or —O—, preferably for —O—, and $R_1$ and $R_2$, independently from each other, stand for hydrogen, $C_1$–$C_8$alkyl, or $C_6$–$C_{14}$aryl, which may be substituted up to three times with $C_1$–$C_8$alkyl, $C_1$–$C_4$alkoxy or halogen, preferably for $C_1$–$C_8$ alkyl, in particular for methyl, as fluorescent compounds (colourants), preferably in marking applications, in general by methods known per se, for example (a) for mass colouring polymers, where the polymers can be polyvinyl chloride, cellulose acetate, polycarbonates, polyamides, polyurethanes, polyimides, polybenzimidazoles, melamine resins, silicones, polyesters, polyethers, polystyrene, polymethyl methacrylate, polyethylene, polypropylene, polyvinyl acetate, polyacrylonitrile, polybutadiene, polychlorobutadiene or polyisoprene, or the copolymers of the cited monomers;

(b) for the preparation of paints, paint systems, in particular automotive lacquers, coating compositions, paper colours, printing colours, inks, in particular for use in ink-jet printers, and for painting and writing purposes, as well as in electrophotography, e.g. for dry copier systems (Xerox process) and laser printers;

(c) for security marking purposes, such as for cheques, cheque cards, currency notes, coupons, documents, identity papers and the like, where a special unmistakable colour impression is to be achieved;

(d) as an additive to colourants, such as pigments and dyes, where a specific colour shade is to be achieved, particularly luminous shades being preferred;

(e) for marking objects for machine recognition of these objects via the fluorescence, preferably for machine recognition of objects for sorting, e.g. including the recycling of plastics, alphanumerical prints or barcodes being preferably used;

(f) for the production of passive display elements for a multitude of display, notice and marking purposes, e.g. passive display elements, notices and traffic signs, such as traffic lights, safety equipment;

(g) for marking with fluorescence in the solid state;

(h) for decorative and artistic purposes;

(i) for modifying inorganic substrates such as aluminium oxide, silicon dioxide, titanium dioxide, tin oxide, magnesium oxide (especially "stone wood"), silicates, clay minerals, calcium-, gypsum- or cement-containing surfaces, for example coatings or plaster surfaces;

(j) in optical light collection systems, in fluorescence solar collectors (see Nachr. Chem. Tech. Lab. 1980, 28, 716), in fluorescence-activated displays (see Elektronik 1977, 26, 6), in cold light sources used for light-induced polymerisation for the preparation of plastics, for testing of materials, for example in the production of semiconductor circuits, for analysing microstructures of integrated semiconductor components, in photoconductors, in photographic processes, in display, illumination or image converter systems, where excitation is effected by electrons, ions or UV radiation, e.g. in fluorescent displays, Braun tubes or in fluorescent lamps, as part of an integrated semiconductor circuit containing dyes as such or in combination with other semiconductors, for example in the form of an epitaxy, in chemiluminescence systems, e.g. in chemiluminescent flashlights, in luminescence immunoassays or other luminescence detection processes, as signal paints, preferably for visually emphasising strokes of writing and drawings or other graphic products, for marking signs and other objects for which a particular visual colour impression is to be achieved, in dye lasers, preferably as fluorescent dyes for generating laser beams, as optical recording medium and also as Q-switches;

(k) for converting the frequency of light, e.g. for turning short-wave light into long-wave visible light or for doubling or tripling the frequency of laser light in non-linear optics;

(l) for tracer purposes, e.g. in biochemistry, medicine, technology and natural science, where the novel colourants can be linked covalently to the substrates or via secondary valences, such as hydrogen bonds or hydrophobic interactions (adsorption); and (m) in highly sensitive detection processes (see Z. Analyt. Chem. 1985, 320, 361), in particular as fluorescent colourants in scintillators.

The present invention is illustrated further by the following examples.

EXAMPLES

Example 1

A solution of 4.5 parts acetic acid (100%) and 13.3 parts hydrochloric acid (36%) in 60 parts water is added with rapid stirring to a solution of 23.4 parts 2,2-dimethyl-1,3-dioxane-4,6-dione dissolved in a solution of 14.5 parts sodium hydroxide (50%) in 270 parts water. The resultant slurry is adjusted to 750 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 93° C. and maintained at this temperature for 30 minutes before being cooled to 70° C. by addition of water. The highly insoluble yellow product is then filtered, washed with water to remove soluble salts, dried and converted to a powder by grinding.

Example 2

A solution of 40.8 parts 2,2-dimethyl-1,3-dioxane-4,6-dione and 24 parts of sodium hydroxide (50%) in 300 parts of water is added to a solution of 25 parts of sodium formate in 420 parts of water. To this solution is added acetic acid (100%) with rapid stirring until pH 6.0. The resultant slurry is adjusted to 1500 parts at a temperature of 15° C. by addition of water and ice. This slurry is then reacted with 32.8 parts of o-dianisidine, previously tetrazotised with sodium nitrite and hydrochloric acid in the usual manner. Ice is added during the reaction to prevent the temperature rising above 20° C. The coupled pigment slurry is then heated to a temperature of 90° C. and maintained at this temperature for 60 minutes before being cooled to 70° C. by addition of water. The highly insoluble red product is then filtered, washed with water to remove soluble salts, dried and converted to a powder by grinding.

Example 3

A solution of 4.5 parts acetic acid (100%) and 13.3 parts hydrochloric acid (36%) in 60 parts water is added with rapid stirring to a solution of 22.7 parts 5,5-dimethyl-1,3-cyclohexanedione dissolved in a solution of 14.5 parts sodium hydroxide (50%) in 270 parts water. The resultant slurry is adjusted to 750 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 93° C. and maintained at this temperature for 30 minutes before being cooled to 70° C. by addition of water. The highly insoluble yellow product is then filtered, washed with water to remove soluble salts, dried and converted to a powder by grinding.

Example 4

A solution of 39.5 parts 5,5-dimethyl-1,3-cyclohexanedione and 24 parts of sodium hydroxide (50%) in 300 parts of water is added to a solution of 25 parts of sodium formate in 420 parts of water. To this solution is added acetic acid (100%) with rapid stirring until pH 6.0. The resultant slurry is adjusted to 1500 parts at a temperature of 15° C. by addition of water and ice. This slurry is then reacted with 32.8 parts of o-dianisidine, previously tetrazotised with sodium nitrite and hydrochloric acid in the usual manner. Ice is added during the reaction to prevent the temperature rising above 20° C. The coupled pigment slurry is then heated to a temperature of 90° C. and maintained at this temperature for 60 minutes before being cooled to 70° C. by addition of water. The highly insoluble red product is then filtered, washed with water to remove soluble salts, dried and converted to a powder by grinding.

Example 5

A solution of 4.5 parts acetic acid (100%) and 13.3 parts hydrochloric acid (36%) in 60 parts water is added with rapid stirring to a solution of 18.2 parts 1,3-cyclohexanedione dissolved in a solution of 14.5 parts sodium hydroxide (50%) in 270 parts water. The resultant slurry is adjusted to 750 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 93° C. and maintained at this temperature for 30 minutes before being cooled to 70° C. by addition of water. The highly insoluble yellow product is then filtered, washed with water to remove soluble salts, dried and converted to a powder by grinding.

Example 6

A solution of 31.6 parts 1,3-cyclohexanedione and 24 parts of sodium hydroxide (50%) in 300 parts of water is added to a solution of 25 parts of sodium formate in 420 parts of water. To this solution is added acetic acid (100%) with rapid stirring until pH 6.0. The resultant slurry is adjusted to 1500 parts at a temperature of 15° C. by addition of water and ice. This slurry is then reacted with 32.8 parts of o-dianisidine, previously tetrazotised with sodium nitrite and hydrochloric acid in the usual manner. Ice is added during the reaction to prevent the temperature rising above 20° C. The coupled pigment slurry is then heated to a temperature of 90° C. and maintained at this temperature for 60 minutes before being cooled to 70° C. by addition of water. The highly insoluble red product is then filtered, washed with water to remove soluble salts, dried and converted to a powder by grinding.

Example 7

A solution of 4.5 parts acetic acid (100%) and 13.3 parts hydrochloric acid (36%) in 60 parts water is added with rapid stirring to a solution of 30.0 parts 5-phenyl-1,3-cyclohexanedione dissolved in a solution of 14.5 parts sodium hydroxide (50%) in 270 parts water. The resultant slurry is adjusted to 750 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 93° C. and maintained at this temperature for 30 minutes before being cooled to 70° C. by addition of water. The highly insoluble yellow product is then filtered, washed with water to remove soluble salts, dried and converted to a powder by grinding.

Example 8

A solution of 53.1 parts 5-phenyl-1,3-cyclohexanedione and 24 parts of sodium hydroxide (50%) in 300 parts of water is added to a solution of 25 parts of sodium formate in 420 parts of water. To this solution is added acetic acid (100%) with rapid stirring until pH 6.0. The resultant slurry is adjusted to 1500 parts at a temperature of 15° C. by addition of water and ice. This slurry is then reacted with 32.8 parts of o-dianisidine, previously tetrazotised with sodium nitrite and hydrochloric acid in the usual manner. Ice is added during the reaction to prevent the temperature rising above 20° C. The coupled pigment slurry is then heated to a temperature of 90° C. and maintained at this temperature for 60 minutes before being cooled to 70° C. by addition of water. The highly insoluble red product is then filtered, washed with water to remove soluble salts, dried and converted to a powder by grinding.

Comparative Example 1

A solution of 4.5 parts of acetic acid (100%) and 13.3 parts of hydrochloric acid (36%) in 50 parts of water is heated to 70° C. and added with rapid stirring to a solution of 31.0 parts of acetoacet-o-toluidide dissolved in a solution of 14.5 parts of sodium hydroxide (50%) in 270 parts of water. The resultant slurry is adjusted to 850 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 90° C. and maintained at this temperature for 20 minutes before being cooled to 70° C. by addition of water. The product is then filtered, washed with water to remove insoluble salts, dried and converted to a powder by grinding.

Comparative Example 2

A solution of 50 parts of acetoacetanilide and 24 parts of sodium hydroxide (50%) in 300 parts of water is added to a solution of 25 parts of sodium formate in 420 parts of water. To this solution is added 20.9 parts of acetic acid (100%) with rapid stirring. The resultant slurry is adjusted to 1500 parts at a temperature of 17° C. by addition of water and ice. The slurry is then reacted with 32.8 parts of o-dianisidine, previously tetrazotised with sodium nitrite and hydrochloric acid in the usual manner. Ice is added during the reaction to prevent the temperature rising above 20° C. The coupled pigment slurry is then heated to a temperature of 90° C. and maintained at this temperature for 60 minutes before being cooled to 70° C. by addition of water. The product is then filtered, washed with water to remove soluble salts, dried and converted to a powder by grinding.

Examples 9–16, Comparative Examples 3–4

Inks are made from each of the pigments described in Examples 1 to 8 and comparative examples 1 and 2 and their fluorescence intensity is measured.

The inks are made by adding to a polyethylene container 200 g of 2.0 to 2.5 mm glass beads, 31 g of nitrocellulose varnish, 51 g of ethanol and 18 g of pigment. The mixture is shaken on a commercial disperser for 45 minutes. 18 g of the resulting mill-base are strained and reduced by adding a further 17 g of nitrocellulose varnish along with 9 g of ethanol and 2.5 g of ethyl acetate. The final ink is then drawn down on non-absorbing paper using a K-bar.

The fluorescence intensities are measured by mounting the drawdowns on to glass slides and running fluorescence spectra using a Perkin-Elmer LS-5B fluorimeter.

The results are given in the following table:

TABLE

Results of application examples

| Ex. | 9 | 10 | 11 | 12 | 13 | 14 | 15 | 16 | Comp. Ex. 3 | Comp. Ex. 4 |
|---|---|---|---|---|---|---|---|---|---|---|
| Pigment from ex. | 1 | 2 | 3 | 4 | 5 | 6 | 7 | 8 | Comp. Ex. 1 | Comp. Ex. 2 |
| Fluorescence Intensity | 145 | 35 | 45 | 15 | 13 | 10 | 19 | 10 | 8 | 4 |

What is claimed is:
1. A fluorescent azo pigment formula I

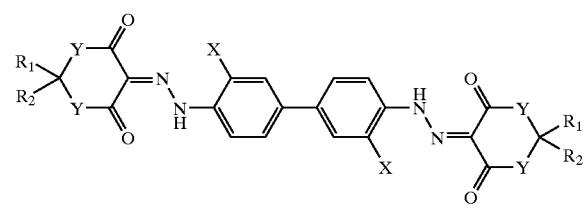

wherein X stands for halogen or $C_1$–$C_4$alkoxy, Y stands for —$CH_2$— or —O—, $R_1$ and $R_2$, independently from each other, stand for hydrogen, $C_1$–$C_8$alkyl, or $C_6$–$C_{14}$aryl, which may be substituted up to three times with $C_1$–$C_8$alkyl, $C_1$–$C_4$alkoxy or halogen, with the proviso that X is not methoxy if both $R_1$ and $R_2$ are methyl and V is —O—.

2. The azo pigment according to claim 1 wherein X is chlorine or methoxy.

3. Process for the manufacture of azo pigments according to claim 1 by
a) tetrazotizing a benzidine derivative of formula (II)

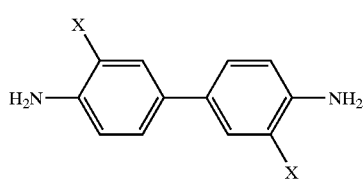

at a temperature in the range of from −10 to 10° C.,
b) coupling the obtained tetrazo product with a diketone of formula (III)

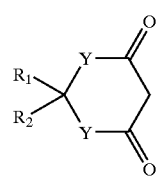

at a temperature in the range of from −5 to 50° C.,
c) then heating the reaction mixture for 0.1 to 2 hours to a temperature in the range of from 50 to 100° C.,
d) separating the reaction product from the reaction mixture, optionally washing it with water, and drying it thereafter.

4. Method of pigmenting a substrate, which comprises applying to or incorporating into said substrate an azo pigment formula (I)

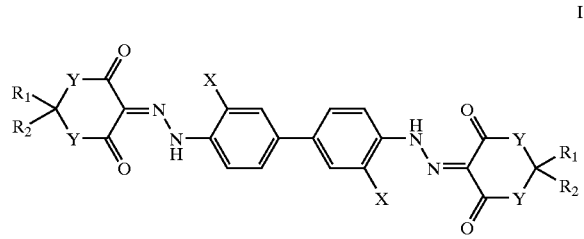

wherein X stands for halogen or $C_1$–$C_4$alkoxy, Y stands for —$CH_2$— or —O—, and $R_1$ and $R_2$, independently from each other, stand for hydrogen, $C_1$–$C_8$alkyl, or $C_6$–$C_{14}$aryl, which may be substituted up to three times with $C_1$–$C_8$alkyl, $C_1$–$C_4$alkoxy or halogen as fluorescent compounds.

5. Method according to claim 4 wherein the fluorescent compounds are used in marking applications.

* * * * *